Oct. 5, 1965     H. STEINMETZ ETAL     3,210,662
ELECTROLYTIC INDICATOR WITH AN ELECTRODE HAVING
A THIN FRANGIBLE COATING THEREON
Filed July 20, 1961

INVENTORS
HYMAN STEINMETZ
STANLEY LAZERUS
BY
ATTORNEYS United States Patent Office 3,210,662

Patented Oct. 5, 1965

3,210,662

ELECTROLYTIC INDICATOR WITH AN ELECTRODE HAVING A THIN FRANGIBLE COATING THEREON

Hyman Steinmetz, New York, and Stanley Lazerus, Pearl River, N.Y., assignors to United Nuclear Corporation, White Plains, N.Y., a corporation of Delaware Filed July 20, 1961, Ser. No. 125,580
6 Claims. (Cl. 324—94)

This invention relates to electrolytic devices for indicating the quantity of current which has flowed in an electric circuit or for indicating the length of time a current has flowed in an electric circuit. More particularly, the invention relates to such a device having a novel form of electrolically inert coating on the anode element of the device.

The use of electrolytic devices for the integration of current flowing in an electric circuit and for the indication of the length of time that a current of predetermined rate has flowed in an electric circuit are well known. In the main, the devices used for these purposes have been essentially laboratory devices. In recent years there has been a number of adaptations of the principles of the laboratory devices in an attempt to provide devices which are capable of pratcical use in electronic and electrical equipment under other than laboratory conditions.

In general, these devices operate according to known electrolytic principles whereby anode material is removed and transported through an electrolyte to a cathode where the material is redeposited. As is well known, the amount of anode material removed in unit time is dependent on the strength of the current. When such a device is inserted in an electric circuit in which the current is substantially constant, then the amount of material removed is directly indicative of the length of time the constant current has flowed in the circuit. Customarily, a device of this kind is provided with an anode of suitable shape and size and a suitable scale or series of graduation is placed on the device adjacent the anode so that the change of some significant dimension of the anode may be readily determined at any given time. Commonly, the anode for a device of this kind is formed as an elongated body with the scale graduations disposed along its length. But an elongated anode must be protected from electrolytic action along its lateral surfaces so that erosion of anode material takes place only at the desired surface which is to serve as the moving indicator of the amount of material removed. The usual practice has been to insert the anode in a close-fitting glass or plastic tube so that electrolyte is only in contact with an end of the anode and cannot reach the lateral surfaces.

It has been found that this arrangement presents a serious difficulty leading to inaccuracy of measurement and frequently causes the device to become inoperative. We have observed that as the end of the anode which is exposed to the electrolyte recedes within the bore of the tube that the electrolytic erosion of the end of the anode does not always occur at a uniform rate over the entire end surface of the anode. The result is that it is difficult, if not impossible, to judge accurately the length of the anode. Furthermore, any slight bubble formation which may occur due to gassing of the electrolyte at the active surface of the anode can create bubbles which do not readily dislodge themselves from the active surface of the anode after it has receded well into the bore of the surrounding tube. These bubbles prevent the electrolyte from reaching the anode material and can partially, and often entirely, obstruct the operation of the device.

We have invented means for overcoming the foregoing difficulties. In accordance with our invention, our new operating time indicator comprises a body of electrical insulating material having a cavity therein. The cavity contains an electrolyte. Also within the cavity there is an electrically conductive cathode in contact with the electrolyte. We also provide in the cavity an electrically conductive anode of a suitable solid material. The anode may have any desired form which will in general give it a plurality of boundary surfaces immersed in the electrolyte. In accordance with our invention, we provide on some, less than all, of these imersed boundary surfaces an electrolytically inert coating; that is to say, all of the immersed surfaces except the surface or surfaces at which electrolytic erosion of the anode is intended to occur are provided with a coating which prevents erosion from the coated surface. Further, in accordance with our invention the coating is of any suitable material which is thin enough to be non-self-supporting when the underlying anode material is removed. Thus, as the anode material is eroded by electrolytic action occurring at the intended surface, the coating material which bounded that material loses its integrity and flakes away to leave the free surface of the anode open and unimpaired.

The invention will now be described in detail in terms of a particular embodiment. In the course of the description reference is made to the accompanying drawings in which:

FIG. 1 is a schematic representation in cross section of an electrolytic operating time indicator; and FIG. 2 is a cross sectional view taken along the line 2—2 of FIG. 1.

Referring now to FIG. 1, an operating time indicator consists of a hollow body 1 of insulating material such as glass or plastic. This body may be elongated and generally cylindrical in shape as is indiacted in the drawings. In the course of this description and in the claims the hollow interior of the body 1 is referred to as a cavity. In the upper portion of the cavity there is a cathode 2 which may be of any suitable shape. Some means such as a conductor 3 is provided for mounting the cathode and for making an electrical connection to an external circuit. In the lower portion of the cavity there is fixed an elongated cylindrical anode 4 which is somewhat smaller in diameter than the internal diameter of that portion of the cavity. At least a portion of the body surrounding the anode is of transparent material and it is provided with a suitably graduated scale which may simply consist of uniformly spaced graduations 5 scribed into the body material. It will be readily understood that the number of graduations and their spacing will depend on the accuracy with which the indication of elapsed time is to be determined.

The anode is fixed into position by any suitable means and a conductive connection such as a wire 6 passes through the wall of the body 1 so that the anode 4 may be connected into an external circuit.

The cavity in which the cathode 2 and the anode 4 are located is filled, or substantially so, with a suitable electrolyte solution 7 which is selected to be compatible with the electrolytic system of which the electrolyte, the anode and the cathode are all components. Many combinations of electrode materials and electrolytes are well known. For example, the anode material may be copper and the electrolyte solution may be an aqueous solution of copper sulfate.

Now, in accordance with our invention, the anode is provided with a thin coating on all of its immersed surfaces with the exception of the one surface from which anode material is intended to be eroded by electroytic action. In this particular embodiment the anode is a relatively thin rod or wire of copper and the erosion of the material is intended to take place at the end of the rod or wire indicated at 8. Therefore, the lateral surfaces are provided with a thin coating of electrolytically inert material which is indicated at 10. Quite apparently, such coatings will prevent actual contact between the lateral surface of the anode and the electrolyte solution. Therefore, there cannot be any erosion of the anode material from the lateral surface. The electrolytic action by which material is eroded from the anode will occur only at the end of the wire at 8. This material will be transferred through the electrolyte solution to the cathode 2. As previously stated when the anode material is eroded away from behind a portion of the coating 10, that portion of the coating loses its integrity and the slightest agitation or vibration will cause it to break away down to the new position of the end 8 of the anode. This effectively reestablishes the initial condition with the end 8 of the anode wholly exposed to the electrolyte solution and with little or no possibility of bubbles being confined by surrounding walls against the end surface of the anode. Moreover, the rate of erosion over the entire end surface of the anode will be substantially uniform because of the ability of the electrolyte to circulate freely across it.

There are numerous materials which may serve as the anode coating and there are numerous ways in which such materials may be applied. For example if the anode material is copper, as in this particular embodiment, or perhaps silver, tin or bismuth, a thin coating of an electrolytically inert metal such as gold, platinum, rhodium or palladium may be applied to the lateral surface of the anode wire by an electroplating process. It will be understood that all reference to electrolytically inert coatings means only that they are electrolytically inert in relation to the particular electrolytic system of which the electrode and the electrolyte solution are component parts.

As an alternative to the metallic types of coatings just described, the anode may be coated with a plastic material such as Krylon. This material may be applied to the cathode by spraying or by dipping techniques.

Figure 1:
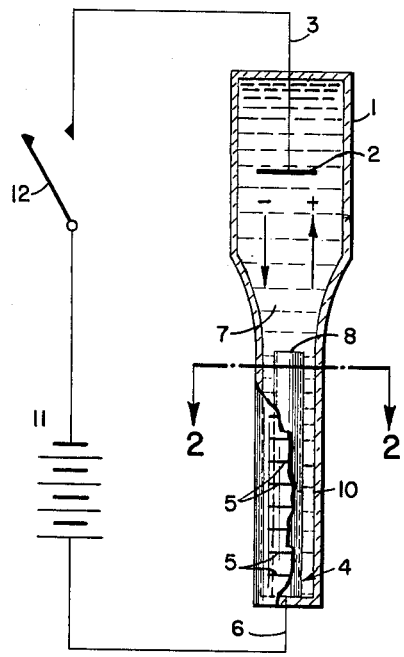
Figure 2:
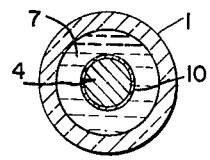

In FIG. 1 I have shown schematically an external circuit consisting of a battery 11 and a switch 12. These components are here connected in series with the indicating device so that its operation may be described in simplest terms. Hence, if one were to close the switch 12 the current is started and it causes the anode material to be eroded away at the end 8 and transported through the electrolyte solution 7 to the cathode 2 where it is deposited. Depending on the internal resistance of the indicating device and on the voltage of the battery 11, the current will have some substantially uniform value with the result that the anode will be eroded away at a correspondingly uniform rate. Therefore, the cross sectional area of the anode wire, the magnitude of the current and the particular materials of the system make it possible to detemine that any given reduction in length of the anode represents the length of time that the current has flowed in the circuit. It will be understood that the device may be used in conjunction with more complex electrical circuits. This description of a particular embodiment has been given solely for the purpose of illustrating the features of the invention. The invention is defined in the following claims.

We claim:

1. An operating time indicator comprising a body of electrically insulating material having a cavity therein, an electrolyte in said cavity, an electrically conductive cathode in said cavity and in contact with said electrolyte, an electrically conductive anode of solid material, said anode having a plurality of boundary surfaces immersed in said electrolyte and some, less than all, of said immersed boundary surfaces having thereon a non-self-supporting electrolytically inert coating, whereby upon application of a potential difference between said anode and said cathode the material of said anode is removed only from those boundary surfaces which are not coated and is deposited on said cathode the electrolytically inert coating being frangibly thin upon removal of said anode material.

2. An operating time indicator comprising a body of electrically insulating material having a cavity therein, an electrolyte solution in said cavity, an electrically conductive cathode in said cavity and in contact with said solution, an elongated solid metal anode having a plurality of boundary surfaces immersed in said electrolyte, and some, less than all, of said boundary surfaces having thereon a non-self-supporting, electrolytically inert coating, whereby upon application of a potential difference between said anode and said cathode the material of said anode is removed only from those boundary surfaces which are not coated and is deposited on said cathode the electrolytically inert coating being frangibly thin upon removal of said anode material.

3. An operating time indicator comprising a body of electrically insulating material having a cavity therein, an electrolyte solution in said cavity, an electrically conductive cathode in said cavity and in contact with said solution, an elongated solid metal anode having at least one lateral surface and at least one end surface immersed in said solution, and all of said lateral surfaces having thereon an electrolytically inert coating to exclude solution from contact therewith, said coating being frangibly thin when unsupported by said anode material, said one end surface being in conductive contact with said solution, whereby upon application of a potential difference between said anode and said cathode the material of said anode is removed only from those boundary surfaces which are not coated and is deposited on said cathode the electrolytically inert coating from under which said anode material has been removed physically disintegrating under the conditions of use of said operating time indicator.

4. An elapsed time indicator according to claim 3 and in which said coating is an electrodeposited layer of metal which is electrolytically inactive in said electrolyte solution.

5. An elapsed time indicator according to claim 3 and in which said coating is a sprayed on layer of a synthetic resin.

6. An operating time indicator comprising a body of electrically insulating material having a cavity therein, an electrolyte solution in said cavity, an electrically conductive cathode in said cavity and in contact with said solution, an elongated solid metal anode having at least one lateral surface and at least one end surface immersed in said solution, and all of said lateral surfaces having thereon an electrolytically inert coating to exclude solution from contact therewith, said inert coating selected from the group consisting of synthetic resin and an electrodeposited layer of metal which is electrolytically inert in said electrolyte solution, said inert material being frangibly thin when unsupported by said anode material, said one end surface of said anode being in conductive contact with said solution, and scale means in proximity to said anode, whereby upon application of a potential difference between said anode and said cathode the material of said anode is uniformly removed only from those surfaces which are not covered with said inert covering such that the uniformly decreasing length of said elongated anode may be measured with said scale means, said inert coating, when unsupported by said anode material, physically disintegrating under the conditions of use of said operating time indicator.

References Cited by the Examiner

UNITED STATES PATENTS

| | | | |
|---|---|---|---|
| 1,256,170 | 2/18 | Schweitzer | 324—94 |
| 2,072,170 | 3/37 | Herzog. | |
| 2,335,295 | 11/43 | Millard. | |
| 2,655,634 | 10/53 | Kroko | 324—94 |

WALTER L. CARLSON, *Primary Examiner.*